Sept. 9, 1952  P. T. HAAKE  2,610,075
ROTARY MECHANICAL SEAL WITH TELESCOPING PARTS
Filed Jan. 13, 1950

INVENTOR.
Paul T. Haake
BY Charles W. Vojtech
Atty.

Patented Sept. 9, 1952

2,610,075

UNITED STATES PATENT OFFICE 2,610,075

ROTARY MECHANICAL SEAL WITH TELESCOPING PARTS

Paul T. Haake, Chicago, Ill., assignor to Crane Packing Company, Chicago, Ill., a corporation of Illinois Application January 13, 1950, Serial No. 138,506

2 Claims. (Cl. 286—11)

The present invention relates to rotary mechanical seals, and more particularly to a seal assembly for sealing relatively rotatable members as for example a shaft and a housing member therefor.

It frequently occurs in the design of such seat assemblies that three or more parts must be telescoped one within the other with the intermediate part or parts compressed between the outer and inner parts. Where the telescoping parts are made by a molding process and of materials which are deformable and resilient, it is difficult to control the diameters of the parts sufficiently closely to permit the parts to be assembled in the desired telescoping relation. Thus, if one part is a molded sealing washer made of a thermosetting resin, one adjacent telescoping part is a rubber sleeve similarly made in a mold, and the third member is a metallic ring made in a punch press or the like, it may frequently occur that the permissible deviation from the desired diameters, i. e., the tolerances, may be cumulative in a direction to cause the space between the washer and the ring to be too small for the rubber member. When this happens, one of the three members must be discarded and replaced with another which will permit the three members to be telescoped. This increases the assembly time and also increases the number of rejected pieces.

The object of this invention is to provide a design of three telescoping parts, the intermediate one of which is to be compressed between the other two which will permit the assembly of any three parts independently of variations of diameters of the parts within normal manufacturing limits.

Figure 1:
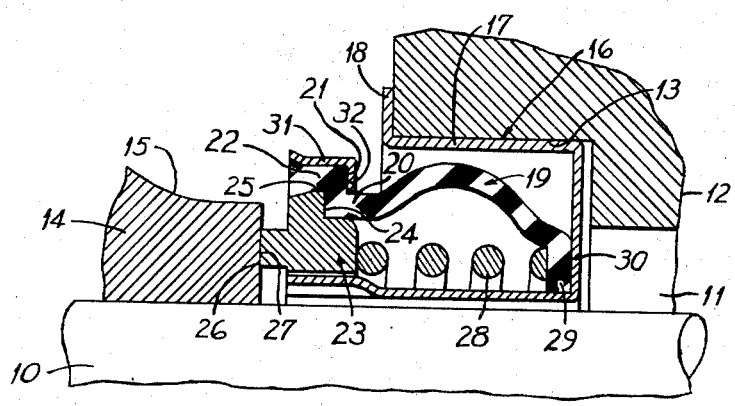
Figure 2:
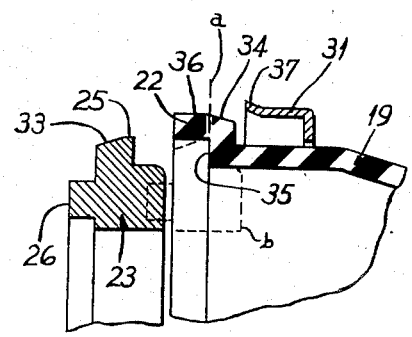

This object will become apparent from the following description when taken together with the accompanying drawings, in which Fig. 1 is a quarter-section taken through a rotary mechanical seal having three parts assembled in accordance with the teachings of this invention; and Fig. 2 is an exploded view of the three elements to be telescoped showing the method of forming each part in accordance with this invention.

In the embodiment chosen for illustration, there is shown a shaft 10 passing through an opening 11 in a housing 12 having a recess 13 formed therein. On said shaft is pressed the hub 14 of vaned pump impeller or the like, said press-fit being also fluid-tight. It is contemplated that the exterior surface 15 of the impeller hub 14 will be exposed to fluid.

In recess 13 is disposed a retainer 16 having a cylindrical wall 17 which is pressed into recess 13 with a fluid-tight fit. A flange 18 on wall 17 locates the retainer in recess 13.

Within retainer 16 is a tubular sealing element 19 made of resilient deformable material such as rubber, either synthetic or natural, or a combination of the two, said element 19 having a substantially cylindrical part 20, a shoulder 21, and a second cylindrical section 22. A sealing washer 23 made of a synthetic resin or other suitable molded material is telescoped into tubular element 19 and is provided with a shoulder 24 having an outer cylindrical surface 25. Said washer 23 is also provided with a radially disposed sealing surface 26 which contacts a similarly radially disposed sealing surface 27 on hub 14 with a fluid-tight fit. A spring 28 bears at one end against washer 23 and at the other end against a flange 29 formed on tubular member 19, said flange in turn abutting on a radially disposed wall 30 on retainer 16.

A rigid band 31, preferably made of stamped metal, telescopes over the second cylindrical portion 22 of tubular member 19 and is intended to compress the said second tubular portion 22 against washer 23 so as to form a fluid-tight fit between the tubular member and washer. A flange 32 on rigid ring 31 abuts on shoulder 21 on tubular member 19 and serves to locate the ring on the tubular member.

It is apparent thus far that the dimensions of the telescoping parts must always be such that the second tubular portion 22 of the tubular member 19 will be compressed against washer 23 in order to insure a fluid-tight seal. The accuracy with which these parts are made, however, has a decided bearing on their cost, it being generally understood that the smaller the tolerance permitted on the parts, the more expensive the parts become. Custom and usage in the trade, however, have established certain tolerances as normal, and if the normal tolerances can be accepted, the lowest prices will prevail. The normal tolerances, however, may result in an excessive amount of material in the second cylindrical portion 22 which will resist the telescoping action and make it necessary to discard a relatively large number of tubular sealing members 19 in addition to delaying the assembly of the unit and thus decreasing the number of such units which may be made in a given time.

When the interfitting parts are made in accordance with this invention, the normal tolerances can be utilized without any loss of time and without rejects for excessive material to be compressed between the ring 31 and washer 23. Referring to Fig. 2, it will be observed that washer 23 is provided with a chamfer 33 on the outer surface thereof, so that the cylindrical portion 25 remaining is relatively small. The second cylindrical portion 22 of tubular member 19 is provided with a chamfer 34 which terminates at the juncture of a line $a$ which is an extension of the radial surface 35 on tubular member 19 and the outer cylindrical surface 36 of the second tubular region 22. Ring 31 is belled at 37 so that its greatest internal diameter is greater than the outside diameter of cylindrical surface 36.

As shown in dotted lines b, when the washer is assembled with respect to the tubular member 19, there is only a relatively narrow portion of the second tubular region 22 which must be compressed between ring 31 and washer 23. On either side of this narrow portion, there is a space provided for the excess material of the second cylindrical region 22 to flow into and thus relieve the compressed region of any excessive pressure which may be built up. One such space is provided by chamfer 33 and the other space is provided by chamfer 34. Thus the actual amount of compressed material which must be flowed is relatively small and such material as must flow has a space into which it can go. It is apparent, therefore, that relatively wide variations in the diameter of the washer or the cylindrical region 22 of a resilient member 19, or of the internal diameter of the ring 31 may be tolerated without any loss of time on the part of the assembly operator, or loss of parts through rejection for improper size.

It is obvious that the principle described above may be applied generally to any series of objects which must be telescoped one in the other with an intermediate object compressed between its inner and outer telescoping objects. Thus, for example, the principle of this invention may be applied to closures for containers as well as to seals, which, in a sense, are likewise closures of a specific variety. The scope of this invention, therefore, should not be limited to the foregoing illustrative embodiment but should be determined by the appended claims.

What is claimed is:

1. A seal assembly for relatively rotatable members including a shaft member and a housing member surrounding the same, said assembly comprising a ring-like sealing washer adapted to be telescopically received over said shaft member, said washer being formed of a rigid, non-compressible material, and having a forward radially disposed running sealing surface adapted to frictionally bear against a radial surface substantially normal to the shaft and movable with the latter, said washer being formed with an annular recess providing a rearwardly facing radially disposed shoulder and a cylindrical surface rearwardly of said shoulder, the periphery of said washer immediately forwardly of said shoulder being formed with a narrow cylindrical band-like region and having a relief area forwardly of said band-like region of reduced diameter, an elastomeric sealing sleeve having a body portion and an offset cylindrical portion at the forward end thereof and providing an intermediate connecting wall having a forwardly facing radially disposed shoulder, means for sealing said body portion to said housing, said sleeve being telescopically received over said sealing washer with the outwardly offset portion surrounding the outer periphery of the washer and with said body portion surrounding said cylindrical surface and with said shoulders in abutting relationship, and a rigid clamping ring telescopically received over said sleeve, said ring having an inner cylindrical surface surrounding said outwardly offset portion of the sleeve and compressing the latter inwardly and against the band-like and relief area of the washer, the thickness of said offset cylindrical portion of said sealing sleeve being greater than the distance between said cylindrical band-like region of the washer and the inner cylindrical surface of said clamping ring whereby upon assembly of the washer, sleeve and ring, a portion of the material of said sleeve is caused to flow into said relief area.

2. A seal assembly for relatively rotatable members including a shaft member and a housing member surrounding the same, said assembly comprising a ring-like sealing washer adapted to be telescopically received over said shaft member, said washer being formed of a rigid, non-compressible material, and having a forward radially disposed running sealing surface adapted to frictionally bear against a radial surface substantially normal to the shaft and movable with the latter, said washer being formed with an annular recess providing a rearwardly facing radially disposed shoulder and a cylindrical surface rearwardly of said shoulder, the periphery of said washer immediately forwardly of said shoulder being formed with a narrow cylindrical band-like region and having a relief area forwardly of said band-like region of reduced diameter, an elastomeric sealing sleeve having a body portion and an offset tubular portion at the forward end thereof and providing an intermediate connecting wall having a forwardly facing radially disposed shoulder, said offset tubular portion presenting an outer cylindrical surface in the forward region thereof and a rearwardly and inwardly inclined conical surface in the rear regions thereof, means for sealing said body portion to said housing, said sleeve being telescopically received over said sealing washer with the outwardly offset portion surrounding the outer periphery of the washer and with said body portion surrounding said cylindrical surface and with said shoulders in abutting relationship, and a rigid clamping ring telescopically received over said sleeve, said ring having an inner cylindrical surface surrounding said outwardly offset portion of the sleeve and compressing the latter inwardly and against the band-like and relief area of the washer, the extreme forward rim of said clamping ring being flared radially outwardly to facilitate assembly of the washer, sleeve and clamping ring, the thickness of said offset cylindrical portion of said sealing sleeve being greater than the distance between said cylindrical band-like region of the washer and the inner cylindrical surface of said clamping ring whereby upon assembly of the washer, sleeve and ring, a portion of the material of said sleeve is caused to flow into said relief area.

PAUL T. HAAKE.

REFERENCES CITED

The following references are of record in the file of this patent:

UNITED STATES PATENTS

| Number | Name | Date |
| --- | --- | --- |
| 1,640,940 | Jaeger | Aug. 30, 1927 |
| 1,671,903 | Jaeger | May 29, 1928 |
| 1,807,187 | White | May 26, 1931 |
| 2,192,395 | La Bour | Mar. 5, 1940 |
| 2,404,690 | Caserta | July 23, 1946 |
| 2,489,545 | Storer et al. | Nov. 29, 1949 |